A. H. MIDGLEY.
COMBINED STARTER AND LIGHTING DYNAMO.
APPLICATION FILED JAN. 29, 1917.
1,325,677.  
Patented Dec. 23, 1919.
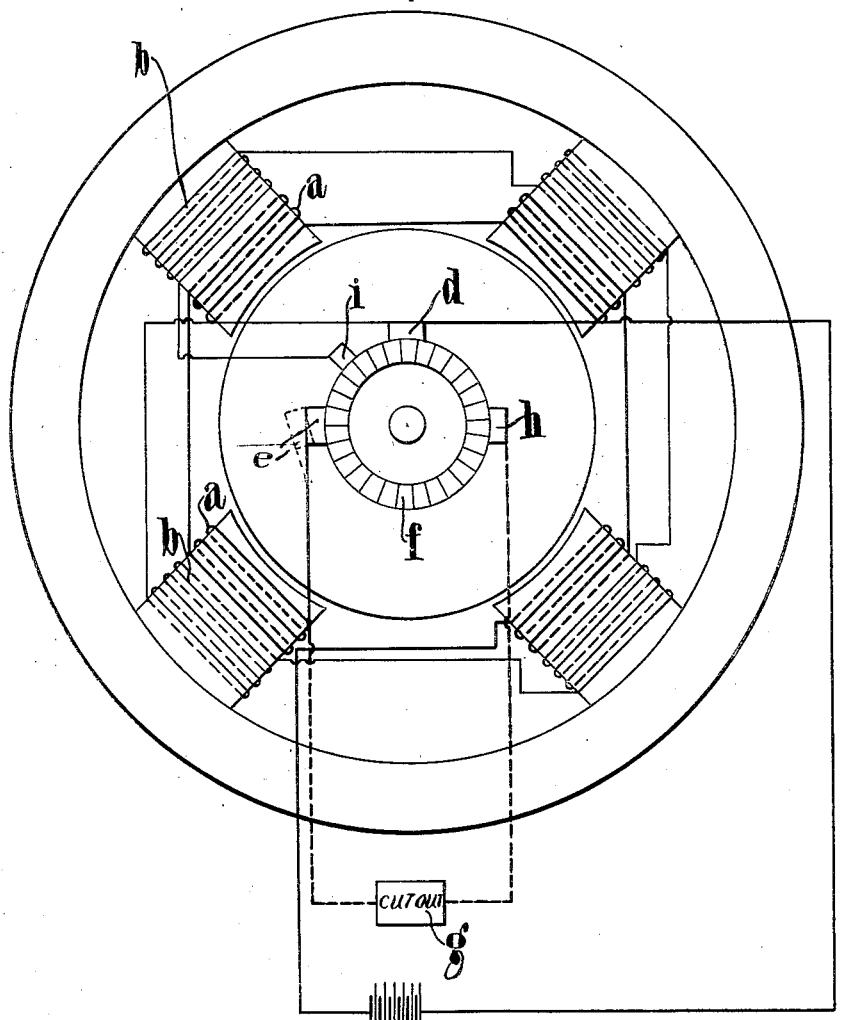
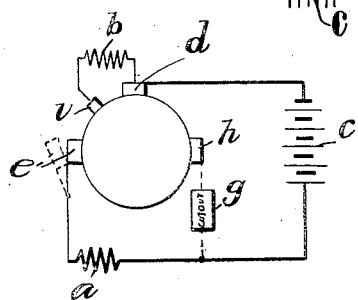
Inventor:
Albert H. Midgley
by Brook Buller Smith
Attorney.

UNITED STATES PATENT OFFICE.

ALBERT HENRY MIDGLEY, OF ACTON VALE, ENGLAND, ASSIGNOR OF ONE-HALF TO C. A. VANDERVELL & COMPANY LIMITED, OF WARPLE WAY, ACTON VALE, ENGLAND.

COMBINED STARTER AND LIGHTING-DYNAMO.

1,325,677. Specification of Letters Patent. Patented Dec. 23, 1919.

Application filed January 29, 1917. Serial No. 145,260.

*To all whom it may concern:*

Be it known that I, ALBERT HENRY MIDGLEY, a subject of the King of Great Britain and Ireland, and residing at Warple Way, Acton Vale, in the county of Middlesex, England, have invented certain new and useful Improvements in and Relating to Combined Starters and Lighting-Dynamos, of which the following is a specification.

This invention relates to an improved combined starter and lighting dynamo, more particularly for use on motor vehicles, motor boats and the like, and of the type in which a single armature provided with one armature winding and one commutator only, is employed.

According to the present invention, the combined starter and lighting dynamo, which is provided with a series and a shunt field excitation winding, has the automatic cut-out inserted directly or indirectly between two brushes of the same polarity, the arrangement being such that when the machine runs as a dynamo one of the latter two brushes is electrically disconnected from the circuit, preferably by being lifted off the commutator, and the automatic cut-out is in action, being connected in the circuit through the other brush of the same polarity, and that when the machine runs as a motor the automatic cut-out is connected across the two brushes of the same polarity so that no heavy starting current passes through it.

With such an arrangement the advantage is attained that the starter switch which has to carry the heavy starting current may be entirely dispensed with, a further advantage being that the electrical connections are simplified in so far as only two cables need be employed for connecting the dynamo with the battery.

In carrying out the invention according to one form of construction, as illustrated diagrammatically and by way of example in Figure 1 of the accompanying drawing, the field magnet of a four-pole machine is provided with a series and a shunt excitation winding $a$ and $b$ respectively, the positive pole of the battery $c$ being connected to one commutator brush $d$ and the negative pole thereof being connected through the series field excitation winding $a$ to a commutator brush $e$ which is capable of being lifted off the commutator $f$ when required, and through the automatic cut-out $g$ to another commutator brush $h$, the two brushes $e$ and $h$ being preferably arranged diametrically opposite each other and at 90° relatively to the brush $d$ which is connected to the positive pole of the battery. In order to obtain a constant output one end of the shunt field excitation winding $b$ is connected to the positive brush $d$ while the other end thereof is connected to a brush $i$ which is preferably arranged between the positive brush $d$ and one of the negative brushes, preferably the movable negative brush $e$.

When the machine hereinbefore referred to is running as a motor, the movable negative brush $e$ rests on the commutator $f$, whereby the automatic cut-out $g$ is rendered inoperative and the heavy starting current is prevented from passing through the same. When the machine is running as a dynamo, the movable negative brush is lifted off the commutator, thereby leaving the automatic cut-out in the circuit between the dynamo and the battery.

According to the modification illustrated in Fig. 2, one end of the automatic cut-out $g$ is connected to a point between the battery $c$ and the series field winding $a$ and through the latter indirectly to the removable commutator brush $e$, while its other end is connected to another commutator brush $h$ which is of the same polarity as the removable brush $e$. In this arrangement when the machine runs as a dynamo and the cut-out is in operation, no current passes through the series field winding $a$.

I wish it to be understood that the invention hereinbefore described is not confined to a four-pole machine and that it may be applied to a two-pole or any multi-pole machine.

Having now described my invention, what I claim as new and desire to secure by Letters Patent is:—

A combined starter and lighting dynamo, comprising a field magnet, a series field excitation winding, a shunt field excitation winding, an armature, an armature winding, a commutator, a source of electric energy, a commutator brush electrically connected with one pole of the source of electric energy, two brushes connected to the other pole of the source of electric energy, an automatic cut-out in the connection between the latter pole and one of the said two brushes connected thereto, the other one of the latter two brushes being capable of being lifted off the commutator when the machine runs as a dynamo, whereby the machine is capable of being converted from a starter into a dynamo, merely by the said lifting off of one of the two brushes connected to one and the same pole of the source of electric energy, and from a dynamo into a starter merely by the replacing of the said brush on the commutator, as and for the purpose set forth.

In testimony whereof I have signed my name to this specification.

ALBERT HENRY MIDGLEY.